No. 713,490. Patented Nov. 11, 1902.
H. POTTIN & L. MOUSSIER.
CASH REGISTER.
(Application filed Jan. 11, 1902.)
(No Model.) 6 Sheets—Sheet 1.

WITNESSES:

INVENTORS:
Henry Pottin
Lucie Moussier
BY
ATTORNEYS.

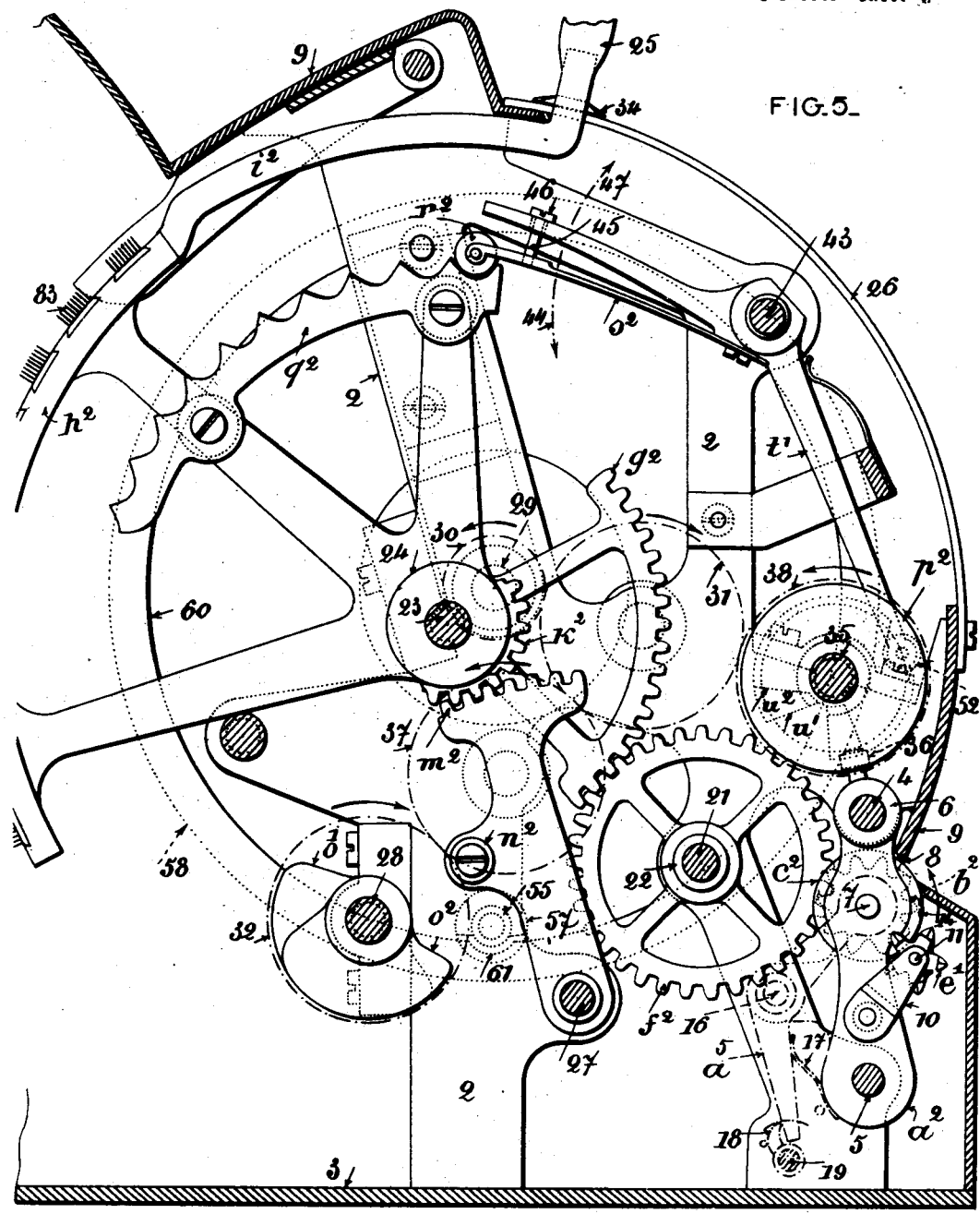

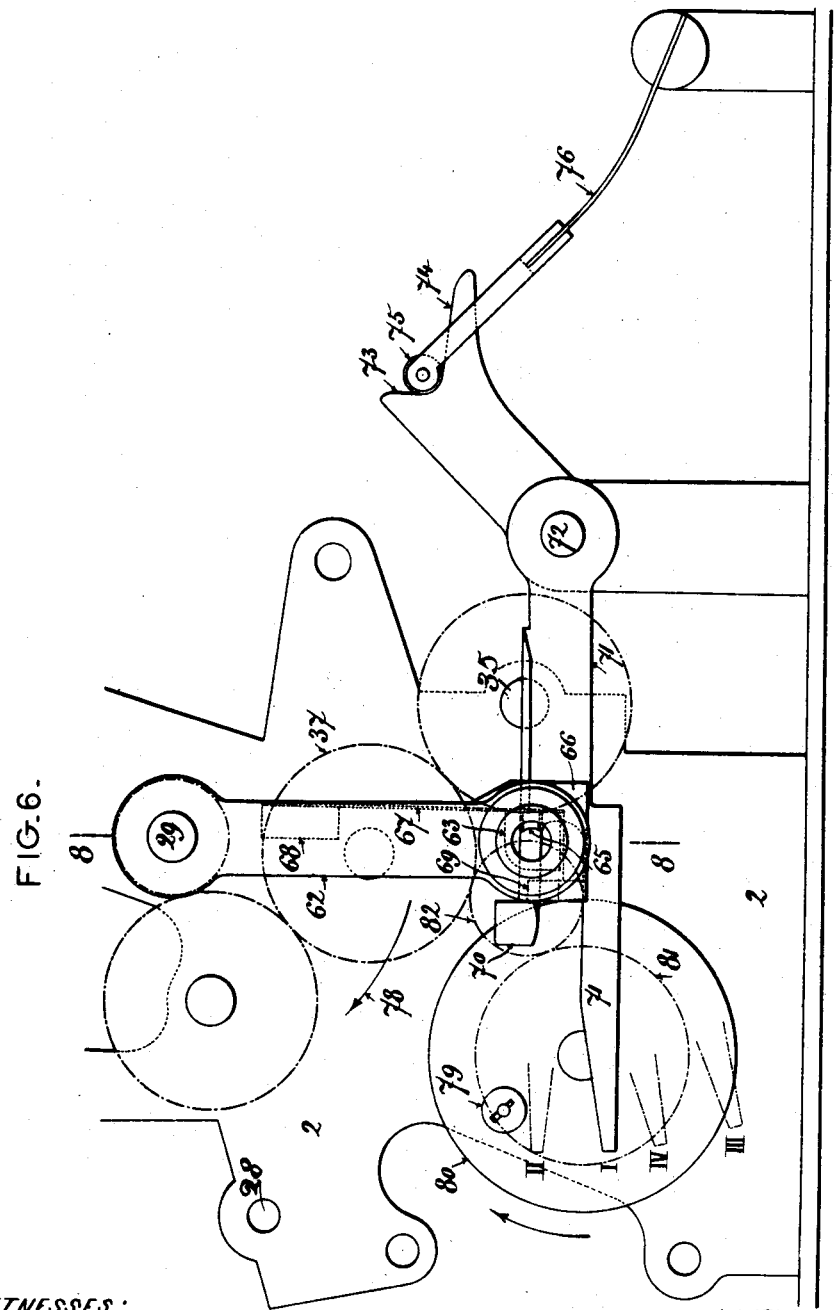

No. 713,490. Patented Nov. 11, 1902.
H. POTTIN & L. MOUSSIER.
CASH REGISTER.
(Application filed Jan. 11, 1902.)
(No Model.) 6 Sheets—Sheet 6.
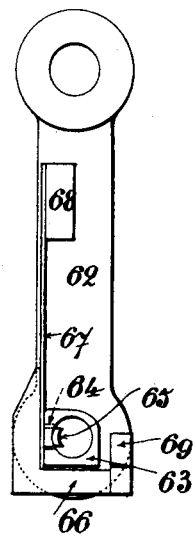
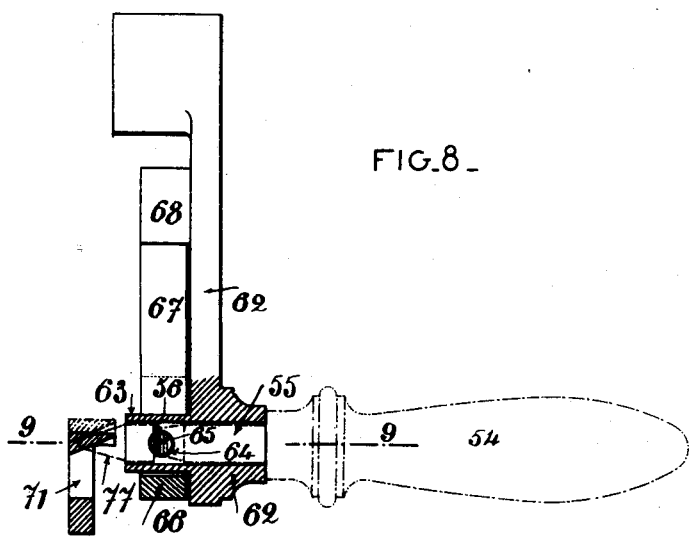
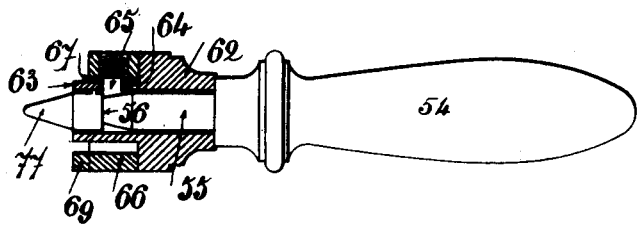
WITNESSES:
INVENTORS:
Henry Pottin
Lucie Moussier
BY
ATTORNEYS

UNITED STATES PATENT OFFICE.

HENRY POTTIN AND LUCIE MOUSSIER, OF PARIS, FRANCE.

CASH-REGISTER.

SPECIFICATION forming part of Letters Patent No. 713,490, dated November 11, 1902.

Application filed January 11, 1902. Serial No. 89,271. (No model.)

*To all whom it may concern:*

Be it known that we, HENRY POTTIN, engineer, and LUCIE MOUSSIER, spinster, citizens of the Republic of France, residing at 100 Rue St. Lazare, Paris, in the Republic of France, have invented certain new and useful Improvements in Apparatus for Indicating or Totaling Cash Payments, of which the following is a specification.

Our invention relates to apparatus of simple and strong construction for indicating or totaling cash payments arranged so as to automatically prevent the key-levers indicating the number to be added to the numbers already registered from getting out of order during the counting or totaling operation from the moment this operation commences until the moment when the partial number indicated by each lever is registered and totaled, while each lever after registration of its partial number is automatically freed and brought back to zero position for the following operation.

The accompanying drawings illustrate by way of example one means of carrying out our invention.

Figure 1:
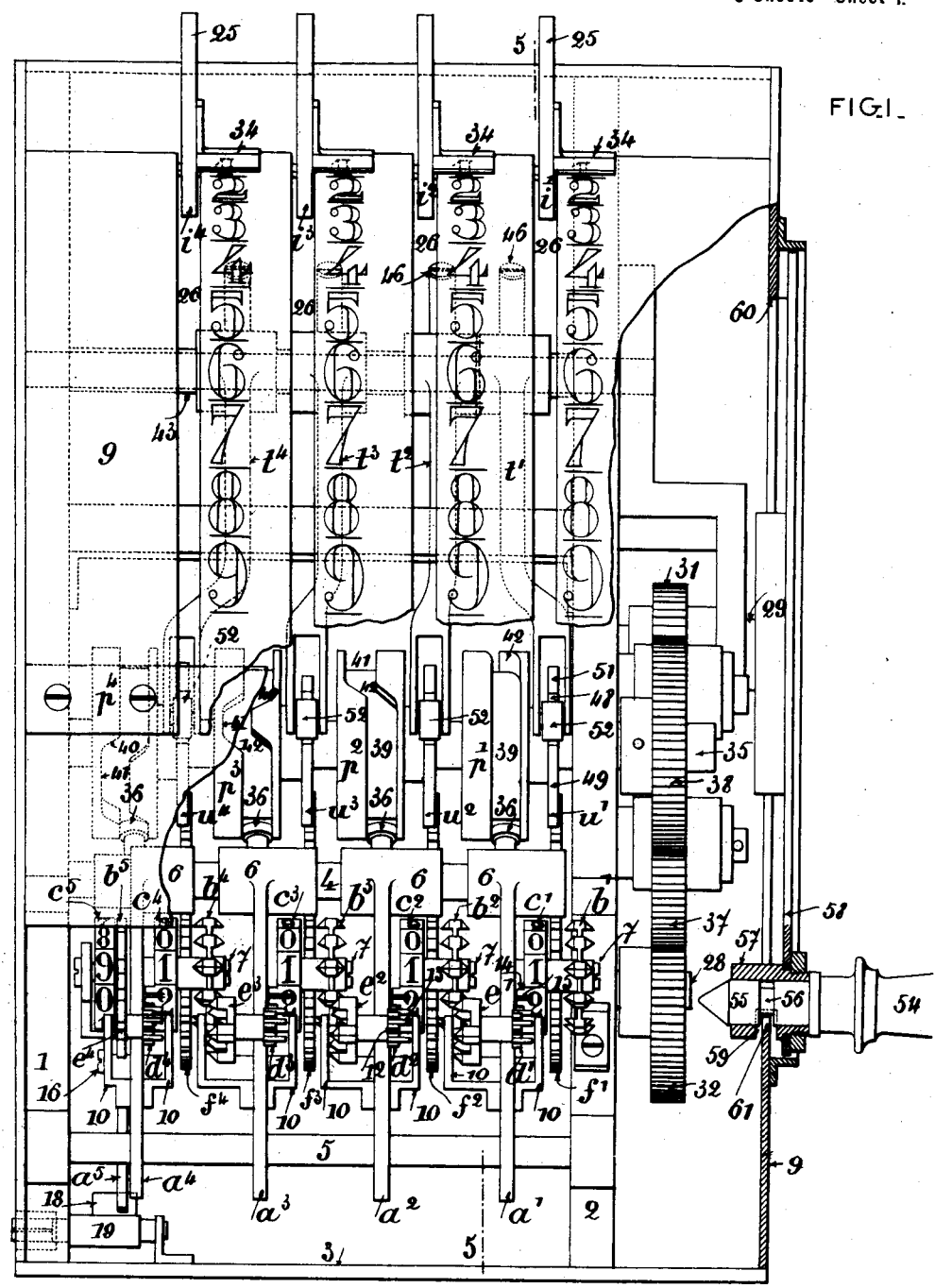
Figure 2:
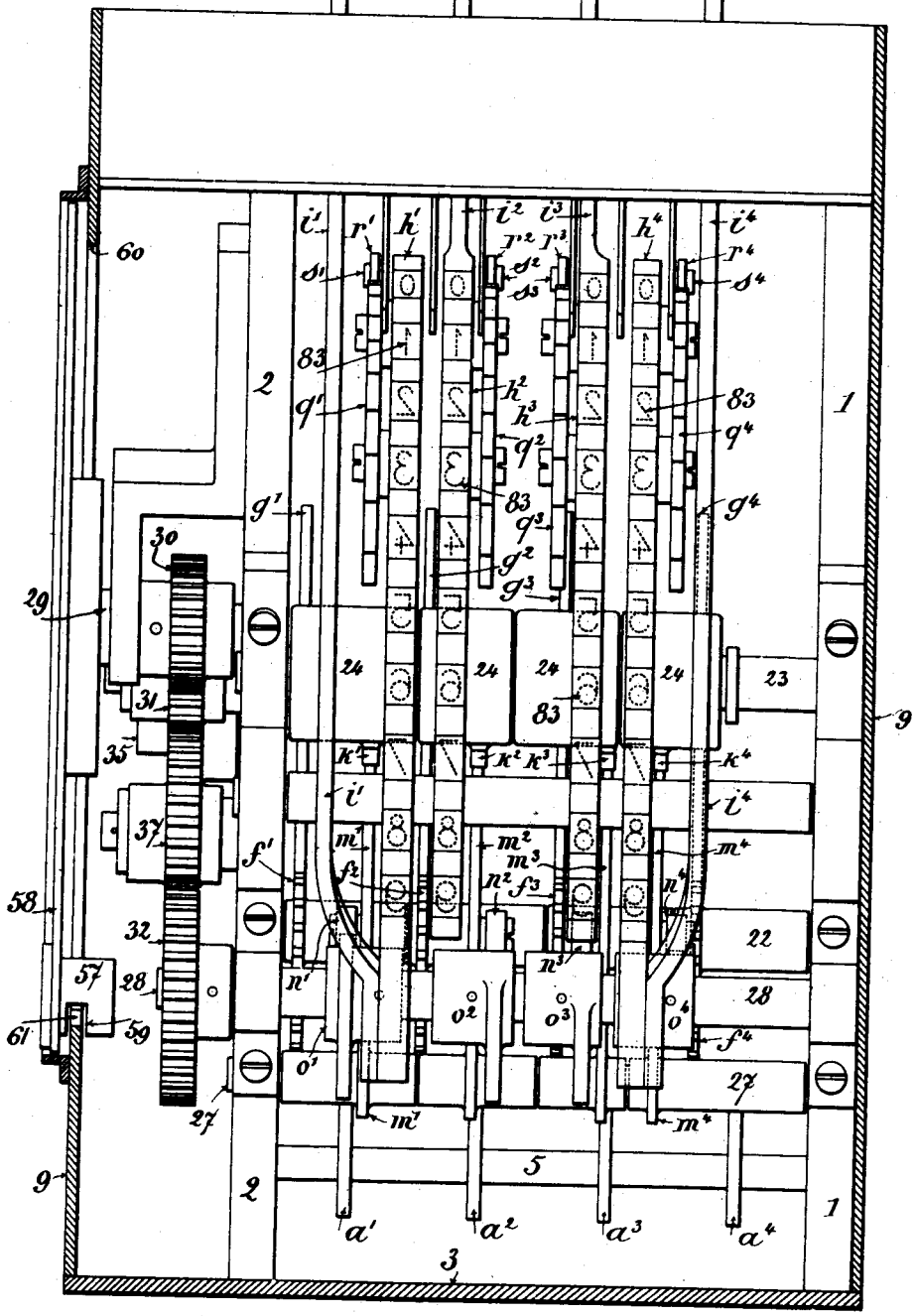
Figure 3:
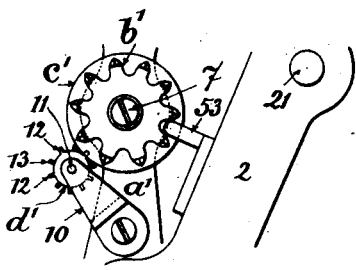
Figure 4:
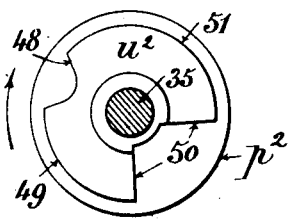

Figure 1 is a front elevation of the apparatus, the casing being partially broken away. Fig. 2 is a rear elevation. Figs. 3 and 4 are detail views showing one of the numbered wheels and the pinions connected therewith. Fig. 5 is a vertical section on the line 5 5, Fig. 1. Fig. 6 is a side elevation illustrating a removable crank. Fig. 7 is an elevation of the inner side of the crank. Fig. 8 is a section on the line 8 8, Fig. 6; and Fig. 9 is a section on the line 9 9, Fig. 8.

The frame comprises two vertical plates 1 2, fixed to a base-plate 3. It supports two fixed horizontal shafts 4 and 5, on which can slide freely supports $a'$ $a^2$ $a^3$ $a^4$, guided so as to move parallelwise by means of sleeves 6, mounted upon the shaft 4 and formed integral with the said supports. Each support carries a fixed arbor 7, on which can freely turn a device comprising a numbered wheel and a toothed wheel. The numbered wheels $c'$ $c^2$ $c^3$ $c^4$ bear figures which can be read outside the apparatus through an aperture 8 in the casing 9. They correspond, respectively, from right to left with cents, tens of cents, dollars, and tens of dollars, so that the whole of the figures read through the aperture 8 can represent the total of the amount registered by the apparatus.

The toothed wheels $b'$ $b^2$ $b^3$ $b^4$ have as many teeth as the corresponding numbered wheels have divisions.

Each of the supports $a'$ to $a^4$ is provided with two arms 10, between which can turn an arbor 11, to which are fixed two wheels.

The wheels $d'$ $d^2$ $d^3$ $d^4$ are provided with teeth, which are alternately narrow (12) and wide, (13,) which gear with lateral teeth 14, formed on the numbered wheels $c'$ to $c^4$ in Maltese-cross fashion.

The toothed wheels $e'$ $e^2$ $e^3$ $e^4$ have uniform teeth, equal in number to the narrow teeth 12 of the wheels to which they are respectively fixed. This latter arrangement serves to cause one wheel—$b^3$, for example—to rotate one division when the preceding wheel $b^2$ has effected a given rotation. In fact, as each division of the wheel $b^2$ corresponds to a ten of cents while each division of the wheel $b^3$ corresponds to a dollar it will be understood that the latter wheel must be advanced one division every time the wheel $b^2$ advances ten divisions. To obtain this result, the support $a^2$ of the wheel $b^2$ is moved at a certain moment, as will be hereinafter seen, so that the wheel $e^2$ is brought into proper gear with the wheel $b^3$. The wheel $b^2$ is then turned by means of a gear, which will be hereinafter described, so that the wheel $c^2$ also rotates and can act upon the wheel $d^2$ by engaging its teeth 14, separated by a deep notch 15, on each side of a long tooth 13. It thus compels this wheel $d^2$ to rotate one division, after which the smooth cylindrical portion of the wheel $c^2$ slides in contact with two long teeth 13, and consequently prevents the wheel $d^2$ from rotating until one of the long teeth 13 again enters a notch 15 in order to again advance one division. The wheel $d^2$ turning one division, the wheel $e^2$ also turns one division as well as the wheel $b^2$, which then gears with it.

The narrow teeth 12 serve to insure the gearing of the teeth 13 between the teeth 14.

The wheel $c'$ has a pair of teeth 14, with a notch 15, and is driven so as to turn one-tenth of a revolution for each cent registered, so that it will act upon the wheel $d'$ in order to turn the wheel $b^2$ one division every time that ten cents have been registered. The divisions of the wheel $c'$ are numbered "0" to "9," so that the division "0" is presented in front of the aperture 8 immediately after the teeth 14 have advanced the wheel $d'$ and the wheel $c^2$ has consequently brought a higher figure in front of the aperture 8. The operation is the same for the other similar arrangements.

The wheel $c^4$ is provided with a pair of teeth 14, so as to cause a toothed wheel $b^5$ to advance one division after each hundred dollars has been registered. This latter wheel is fixed to a numbered wheel $c^5$, the figures "0" to "9" on which correspond to hundreds of dollars.

The apparatus illustrated thus allows of registering a total of nine hundred and ninety-nine dollars and ninety-nine cents. The addition of a cent then causes all the wheels to turn, so that wheels $c'$ to $c^5$ present five naughts in front of the aperture 8.

The last pair of wheels $b^5$ $c^5$ is mounted upon a support $a^5$, (indicated in dotted lines in Fig. 5,) hinged at 16 to the support $a^4$, so that it can be rocked backward when it is required to disengage the wheel $b^5$ from the wheel $e^4$ and at the same time accompany the support $a^4$ in its movement along the shaft 4. A spring 17 acts upon the support $a^5$ to keep the wheel $b^5$ in gear with the wheel $e^4$, and an oscillating cam 18, mounted upon an arbor 19, allows the said support $a^5$ to be moved away against the action of the spring. The arbor 19 can be operated from the outside of the casing 9 by means of a key, so that an authorized person can thus disengage the wheel $b^5$ in order to turn it by hand and replace it at zero when required.

The mechanism serving to cause the above-described wheels to turn independently of one another comprises the following parts: Upon a fixed shaft 21 are mounted four loose and independent toothed wheels $f'$ $f^2$ $f^3$ $f^4$, prevented from sliding on the said shaft because their bosses 22 are adjusted against one another. The wheels $b'$ to $b^4$ can gear with the wheels $f'$ to $f^4$, respectively, when the supports $a'$ to $a^4$ are moved from right to left; but these wheels are not in gear when the apparatus is at rest. Each of the wheels $f'$ to $f^4$ is always in gear with one of the toothed sectors $g'$ to $g^4$, mounted loose upon the fixed shaft 23. The sectors can be successively actuated in two different ways. In the first place each sector $g'$ to $g^4$ is fixed by means of its boss 24 to another sector $h'$, $h^2$, $h^3$, or $h^4$, to which is fixed a curved lever $i'$ $i^2$ $i^3$ $i^4$, terminated by a finger-key 25, the keys 25 projecting outside through slots 26 in the casing 9, so that they can be actuated by hand along the said slots by pivoting around the shaft 23, and thus moving with them the first-mentioned sectors. In the second place the bosses 24 are provided with toothed sectors $k'$ to $k^4$, perpetually in gear with sectors $m'$ to $m^4$, independent of one another and rocking loosely upon a fixed shaft 27. Each of these sectors $m'$ to $m^4$ is provided with a roller $n'$ to $n^4$, against which can act a corresponding cam $o'$ to $o^4$. These cams are perpetually fixed upon a common shaft 28, which can be turned by means of a crank-handle through the medium of the crank-shaft 29, carrying a pinion 30 and pinions 37 and 32, the latter of which is fixed to the shaft 28. In the position of rest the cams $o'$ to $o^4$ do not act upon the rollers $n'$ to $n^4$; but when the crank-shaft 29 is sufficiently rotated, the shaft 28 turns in the direction indicated by an arrow, and the cams act in rotation upon the rollers $n'$ to $n^4$, and thus bring back all the sectors $m'$ to $m^4$ to their initial position of rest if they have been moved therefrom. By this movement the bosses 24 are also rotated upon the shaft 23, carrying with them the sectors $g'$ to $g^4$ and $h'$ to $h^4$, so as to bring them back into their initial position of rest. The result thus is that the keys 25, fixed to the sectors $h'$ to $h^4$, are brought back to their position of rest, while the sectors $g'$ to $g^4$ cause the wheels $f'$ to $f^4$ to rotate backward, and the latter cause the wheels $b'$ to $b^4$ to consequently rotate forward, the latter being geared in proper time with the wheels $f'$ to $f^4$, as will be hereinafter described. It will be understood, consequently, that the result of the action of each of the cams $o'$ to $o^4$ upon the corresponding rollers $n'$ to $n^4$ is to cause one of the numbered wheels $c'$ to $c^4$ to advance to an extent proportionate to the angle to which the corresponding sector $h'$ to $h^4$ may be moved back—that is to say, to an extent proportionate to the angle to which it had been formerly turned in a forward direction. Now divisions numbered "1" to "9" are marked along the slots 26 in the casing, each of which corresponds with one of the divisions of the wheels $c'$ to $c^4$, respectively. Moreover, the finger-key 25 is provided laterally with a plate 34, arranged so as to conceal the first figure of each vertical row when the key is in the initial position of rest. When the key is moved one division, the figure "1" will be uncovered. If it be moved three divisions, figure "3" will be seen above the plate, &c. This arrangement of the keys and figures is advantageous for preventing errors in reading.

The mechanism serving to laterally move the supports $a'$ to $a^4$ to engage the wheels $b'$ to $b^4$ with the wheels $f'$ to $f^4$ comprises a cam-shaft 35, on which are permanently fixed cams $p'$ $p^2$ $p^3$ $p^4$, each of which is provided on its periphery with a groove in which is engaged one of the rollers 36, fixed on the sleeves 6 of the supports $a'$ to $a^4$. The shaft 35 is actuated in the direction indicated by an arrow by means of the crank-shaft 29 through the medium of pinions 30, 31, and 38, the latter of which, 38, is fixed to the shaft 35.

Each of the cams $p'$ to $p^4$ is provided with a groove comprising circular portions 39 and 41, Fig. 1, and portions 40 and 42, inclined in opposite directions, so that in the position of rest the parts 39 are engaged on the rollers 36 and keep the supports $a'$ to $a^4$ in their right-hand position of rest, Fig. 1. When the shaft 35 is rotated, the parts 40 act upon the said rollers in order to push them toward the left hand. Then the parts 41 keep them to the left. The parts 42 afterward bring them back to the right, and the parts 39 again keep them to the right. The crooked portions 40 41 42 are in advance of one another upon the various cams $p'$ to $p^4$, so as to act successively upon the rollers 36 and, moreover, to bring back toward the right one of the supports—$a'$, for example—while the following support $a^2$ is pushed toward the left, &c. We would also observe that the crooked portions 40 41 are placed so as to cause the movement of one of the supports $a'$ to $a^4$ toward the left slightly before the corresponding cam $o'$ to $o^4$ commences to act upon the roller $n'$ to $n^4$ of the corresponding sector $m'$ to $m^4$ in order that the wheels $b'$ to $b^4$ may be completely engaged with the wheel $f'$ to $f^4$ before the latter is actuated. The apparatus also comprises a mechanism serving to insure the position of the keys 25. To this end the sectors $h'$ to $h^4$, carrying the key-levers, are fixed to the sectors $q'$ to $q^4$, the teeth of which correspond, respectively, with the stop-divisions of the keys. On these sectors $q'$ to $q^4$ act rollers $r'$ to $r^4$, carried by flexible arms $s'$ to $s^4$, firmly fixed at one of their ends to rigid oscillating levers $t'$ to $t^4$, independent of one another and mounted loose upon a fixed shaft 43.

The upper end of the levers $t'$ to $t^4$ extends above the rollers $r'$ to $r^4$, so that the latter can be pressed rigidly upon the sectors $q'$ to $q^4$ when the said levers $t'$ to $t^4$ are rocked in the direction of the arrow 44, Fig. 5. The sectors $q'$ to $q^4$ are thus rendered completely immovable. Moreover, screws 45, having heads 46, are screwed into the arms $s'$ to $s^4$ and pass freely through apertures made in the levers $t'$ to $t^4$, so that the arms $s'$ to $s^4$, with their rollers, are compelled to move away from the sectors $q'$ to $q^4$ when the levers $t'$ to $t^4$ are rocked in the direction of the arrow 47, Fig. 5. The sectors $q'$ to $q^4$ are thus rendered free to oscillate without resistance. The levers $t'$ to $t^4$ are operated by means of cams $u^2$ to $u^4$, fixed to the shaft 35. These cams each have two circular portions 49 and 51, Fig. 4, of like radius, and two recessed portions 48 and 50, the latter of which is deeper than the former. They act upon roller 52, mounted on the lower ends of the levers $t'$ to $t^4$.

In the position of rest of the apparatus all the rollers 52 rest in the recessed portions 48, so that the levers $t'$ to $t^4$ occupy the medium position represented in Fig. 5. In this position the rollers $r'$ to $r^4$ are elastically pressed upon the sectors $q'$ to $q^4$ and can be lifted by the teeth of the said sectors, when they will be moved by hand. They serve to keep these sectors with a certain force in the various positions given to them. When the shaft 35 is turned, the rollers 52 are at first simultaneously lifted by the parts 49 of the cams $u'$ to $u^4$, so that the levers $t'$ to $t^4$ are rocked in the direction of the arrow 44, and thus prevent the rollers $r'$ to $r^4$ from being lifted by the teeth of the sectors $q'$ to $q^4$. These sectors are consequently rigidly immovable, as well as all the parts which are attached thereto. The rotation continuing, the part 49 of the cam $u'$ allows the roller 52 to escape from the corresponding lever $t'$, and the said roller falls into the deep recess 50, so that the lever $t'$ rocks in the direction of the arrow 47 sufficiently far to lift the roller $r'$ through the medium of the screw 45 above the teeth of the sector $q'$. The result is that this sector can be moved at this moment without any resistance, while the other sectors $q^2$ to $q^4$ are still rigidly immovable.

The notch 50 of the cam $u'$ is so located as to free the sector $q'$ immediately after the cam $p'$ has caused the engagement of the wheel $b'$ with the wheel $f'$, but before the cam $o'$ acts on the sector $m'$ to bring back the sectors $k'$, $g'$, $q'$, and $h'$ to their initial position of rest. The result is that the totaling or counting wheels carried by the support $a'$ will be advanced a number of divisions equal to that which the sector $q'$ will have been turned in the last instance without possible error, and, moreover, the sector $q'$ can be brought backward by the action of the cam $o'$ without any resistance being offered on the part of the roller $r'$. The shaft 35 continuing to rotate, the part 51 of the cam $u'$ will act upon the roller 52 to bring back the lever $t'$ in the direction of the arrow 44, Fig. 5, until the roller $r'$ bears rigidly upon the sector $q'$ in order to again render it immovable. This effect is produced only after the cam $o'$ has completely pushed back the sector $m'$, and the sector $q'$ is consequently brought back to its initial position of rest.

The parts 49 of the cam $u'$ to $u^4$ are of successively-increasing length, the notches 50 being in advance of one another in correlation with the crooked portions 40 of the cams $p'$ to $p^4$ and with the projecting parts of the cams $o'$ to $o^4$, so that the hereinbefore-described stages in the operation of the cam $u'$ and the lever $t'$ are similarly repeated for the other cams $u^2$ to $u^4$ and for the levers $t^2$ to $t^4$.

The operation of the apparatus is as follows: The keys 25 being in position shown in Fig. 1, they are depressed by hand, so that the figures situated immediately above the plates 34 represent the sum of money to be counted or totaled. The crank-shaft 29 is then rotated. The sectors $q'$ to $q^4$ are immediately put in gear by the rollers $r'$ to $r^4$ through the action of the cams $u'$ to $u^4$ on the levers $t'$ to $t^4$, so that they cannot be accidentally put out of order during the operation. When the part 40 of the cam $p'$ acts upon the roller 36, the support $a'$ is moved to the left and the wheel $b'$ gears with the wheel $f'$. Then the part 50 of the cam $u'$ allows the roller 52 to escape, so that the lever $t'$ sets the sector $q'$ free. Afterward the cam $o'$ acts upon the roller $n'$ of the sector $m'$, so that the latter is moved back one or several divisions if it has been previously advanced one or several divisions by reason of the inscription of one or several cents by the aid of the key 25 of the lever $i'$, or this sector $m'$ remains in place if it has not been previously moved out of its position of rest. In the first case the return oscillation of the sector $m'$ brings back the sectors $q'$ and $h'$ to their initial position at the same time that it causes the sector $g'$, the wheel $f'$, and the wheel $b'$ to rotate one or several divisions, as well as the numbered wheel $c'$, which is fixed thereto. A new figure of the wheel $c'$ is thus brought in front of the aperture 8. In the second case the sectors remain at rest, as well as the wheels $f'$ and $b'$. Immediately after the return of the sectors to the initial position the part 51 of the cam $u'$ causes the lever $t'$ to oscillate in order to again place the sector $q'$ in engagement. Then the part 42 of the cam $p'$ brings back the support $a'$ to the right, thus disengaging the wheel $b'$ from the wheel $f'$, and simultaneously the part 40 of the cam $p^2$ pushes the support $a^2$ to the left, thereby engaging the wheel $b^2$ with the wheel $f^2$. The cam $u^2$ in turn acts to liberate the sector $q^2$. Then the cam $o^2$ brings back to their initial position the sectors $m^2$ $k^2$ $q^2$ $h^2$, consequently causing the wheels $b^2$ and $c^2$ to advance as many divisions as the key 25 of the lever $i^2$ has been previously moved to tens of cents. The operation is thus followed step by step toward the left of the apparatus until the cam $o^4$ has acted on the sector $q^4$ to register the tens of dollars. The cam $p^4$ then brings back the support $a^4$ to the right. Then the notches 48 of the cams $u'$ to $u^4$ having turned a complete revolution are presented again in front of the rollers 52, so that the levers $t'$ to $t^4$ are simultaneously brought back into their initial position, Fig. 5, to allow a new operation to be effected. The figures of the wheels $c'$ to $c^5$ then indicate the total of the last sum registered and of the amounts previously registered. The position of these wheels cannot be accidentally disarranged, because the wheel $b'$ gears when it is in its right-hand position of rest with a stop-notch 53, fixed to the frame 2, Fig. 3, while the other wheels $b^2$ to $b^4$ gear, respectively, with the wheels $e'$ to $e^4$, which are prevented from turning by the corresponding wheels $d'$ to $d^4$, which bear against the wheels $c'$ to $c^4$, like Maltese crosses.

With the object of preventing the mechanism being actuated by an unauthorized person, we employ a removable crank-handle 54, Fig. 1, for turning the crank-shaft 29. Moreover, for preventing the handle from being withdrawn before the totaling or counting operation is finished—that is to say, before the cam-shafts 28 and 35 have effected a complete revolution—we employ the arrangement indicated in Figs. 1 and 2. The stem 55 of the crank-handle 54 is provided with a circular groove 56 and can be introduced into a socket or ring 57, fixed in the interior of a disk 58, permanently fixed to the shaft 29. This ring is provided with a notch 59 on its outer side, and in this notch is engaged the edge 60 of a circular aperture made in the casing $g$, concentrically with the shaft 29. The edge 60 reaches far enough forward in ring 57 to engage in the groove 56, so that it prevents the handle from being withdrawn from the ring or socket, and as this edge possesses a single cut-away portion 61, Fig. 5, on its periphery it will be understood that the handle can be withdrawn outside the socket 57 or again introduced therein only when the stem 55 is brought opposite the said cut-away portion 61. With the diameters of the toothed wheels adopted in the construction described it is necessary that the shaft 29 shall turn two revolutions while the shafts 28 and 35 are making one revolution. Consequently the crank-handle will be conveniently withdrawn from the socket 57 at the end of two revolutions. Nevertheless, if it be withdrawn after a single revolution this would not cause any inconvenience, because the sectors $q'$ to $q^4$ would be at that moment still rigidly immovable through the levers $t'$ to $t^4$, and consequently the keys 25 could not be operated.

In Figs. 6 to 9 we have shown a modification of the engaging mechanism of the crank-handle arranged to absolutely prevent the handle from being withdrawn before two revolutions have been completed and also for preventing it from being turned more than two revolutions. This arrangement comprises a crank 62, rigidly fixed to the shaft 29, and the free end of which is provided with a socket 63, having a hole through it to receive the stem 55 of the crank-handle. This socket is provided with a lateral notch 64 for the passage of a bolt 65, designed to engage in the circular groove 56 in the stem 55, which bolt is formed integral with a U-shaped piece 66, carried by a flat spring 67, one end of which is fixed at 68 to the crank 62. This piece 66 is provided with a nose 69, adapted to strike against a heel 70, formed on an oscillating lever 71, mounted upon a shaft 72. This lever has a cam comprising two inclined planes 73 74 on which bears a roller 75, carried by a spring 76, so that the lever 71 is brought back into the position I, (indicated at Fig. 6,) if it has been moved from this position either upward or downward. This lever can be lifted by the conical point 77 of the stem 55 when the latter is introduced into the bottom of the socket 63, (position II.) The heel 70 then ceases to offer any obstruction to the nose 69, and the crank 62 is consequently free to turn in the direction of the arrow 78, Fig. 6. On the other hand, the lever 71 can be lowered by means of a roller 79, mounted upon a disk 80, the shaft of which is fixed to the frame 2. This disk 80 is fixed to a wheel 81, connected by an intermediate wheel 82 to the wheel 37, so that it turns in the same direction as the crank-shaft 29 at half the speed. Toward the end of the first revolution of the crank the roller 79 acts on the lever 71 and forces it down, so that the heel 70 is moved out of the way of the U-shaped piece 66, socket 63, and the point 77, (position III.) The rotation can thus be continued. Toward the ends of the second revolution the point 77 encounters the lever 71 and forces it down, but not to a sufficient degree to allow the heel 70 to permit the nose 69 to pass, (position IV.) The crank-handle cannot then be turned beyond two revolutions. When the nose 69 is thus brought back against the heel 70, the groove 56 can be disengaged outside the bolt 65 by slightly pushing the handle in the direction of the arrow 78, so that the stem 55 can be withdrawn from the socket 63. It will be understood that the disengagement of the bolt 65 cannot be effected at any other moment, since the said bolt would require a fixed bearing-point in order to be moved back with relation to the crank-handle and that it only encounters the heel 70 at the end of two revolutions of the crank. When withdrawing the stem of the crank-handle, the lever 71 rises to a small extent and retakes its initial position of rest, Fig. 6.

The counting or totaling apparatus represented by way of example is designed to be combined with a recording mechanism serving to print upon a band of paper the number represented by the keys 25 before each counting or totaling operation. It is for this reason that the sectors $h'$ to $h^4$ are provided with figures formed of perforating-points 83; but this arrangement is not essential to the invention and the counting or totaling apparatus can be employed alone or in combination with other mechanism.

We claim—

1. An apparatus for indicating or totaling cash payments, comprising toothed wheels $f$ adapted to be rotated a variable number of divisions, the described hand mechanisms for effecting the respective rotations; slidable supports, a numbered wheel $c$ carried by each support and provided with a toothed wheel $b$ adapted to be engaged with wheels $f$ and afterward disengaged, a cam mechanism serving to successively move the supports to engage the wheels $b$ with the wheels $f$ and to disengage them; a cam mechanism serving to successively bring back the wheels $f$ to their initial position of rest after the wheels $b$ have been engaged with them; and means for causing each toothed wheel $b$ corresponding to a series of units, to turn one division after the numbered wheel $c$ corresponding to the series of units of inferior order has rotated a given number of divisions, substantially as set forth.

2. An apparatus for indicating or totaling cash payments, comprising toothed wheels $f$, oscillating toothed sectors $g$ meshing with the wheels $f$, sectors $h$ secured to the sectors $g$ and carrying type having sharp points 83, key-levers $i$ secured to the sectors $h$, slidable supports, number-wheels $c$ mounted in the supports and each provided with a toothed wheel $b$, means for moving the supports to bring the toothed wheels of the numbered wheels into mesh with the wheels $f$ after they have been turned by the said sectors, and means for bringing the wheels $f$ successively back to zero position.

3. An apparatus for indicating or totaling cash payments, comprising toothed wheels $f$, oscillating toothed sectors $g$, coöperating with sectors $q$, and gearing with the said wheels $f$, means for oscillating the said sectors by hand, levers $t$ adapted to fix the said sectors $q$ in any position, numbered wheels, a cam mechanism $p$ to bring said numbered wheels successively into engagement with the wheels $f$, a cam mechanism $o$ to bring the wheels $f$, as well as the sectors $q$, successively back to zero position, and a cam mechanism $u$, to bring the levers $t$ into engagement with the sectors $q$, at the beginning of the movement of the cam mechanisms $p$ and $o$, and to disengage the said levers during the action of the cams $o$, in order to allow the wheels $f$ to turn backward.

4. In an apparatus for indicating or totaling cash payments, the combination, with the shaft, numbered wheels, and mechanism operated by said shaft for advancing said wheels, of a crank-plate fixed to the shaft, a socket 57, provided with a slot 59 and fixed to the said plate, a fixed crown 60, engaged in the said slot 59, and a crank-handle 54, engaging freely in the said socket 57 and provided with a circular groove 56, in which the fixed crown 60 also engages, the said crown having a slot in one part of its inner periphery to allow of the insertion of the handle in the socket.

5. In an apparatus for totaling cash payments, slidable supports, revoluble wheels mounted in the supports and each provided with ordinals and lateral teeth, a wheel rigidly connected with each of said numbered wheels, an operating mechanism, means for moving the toothed wheels of the numbered wheels into engagement with the operating mechanism, a shaft carried by each support, and two wheels secured to said shaft, one of the said wheels being provided with alternately narrow and wide teeth and the other wheel having teeth corresponding in number to the narrow teeth of the first-named wheel.

6. An apparatus for totaling cash payments, comprising toothed wheels, toothed sectors connected therewith and free to oscillate, other toothed sectors rigidly connected with first-mentioned sectors, levers for actuating all of said sectors, wheels provided with numbers, cams for restoring said toothed wheels to their original positions, and mechanism for bringing said levers into engagement with certain of said sectors and to cause the disengagement thereof.

7. An apparatus for totaling cash payments, comprising toothed wheels, toothed sectors connected therewith and free to oscillate, other toothed sectors connected with the first-mentioned sectors, manually-controlled key-levers, wheels provided with ordinals, and means for connecting the same with said toothed wheels.

8. An apparatus for totaling cash payments, comprising slidable supports, numbered wheels mounted in the supports and each provided with a gear-wheel, gear-wheels, sectors meshing with the latter gear-wheels, other sectors connected with the first-mentioned sectors, manually-operated key-levers connected with the said sectors, and means for sliding the said supports to move the gear-wheels of the numbered wheels into and out of mesh with the gear-wheels with which the sectors mesh.

9. An apparatus for totaling cash payments, comprising sliding supports, numbered wheels mounted in the supports and each provided with a gear-wheel, gear-wheels, sectors meshing with the latter gear-wheels, other sectors connected with the first-mentioned sectors, manually-operated key-levers connected with the said sectors, means for sliding the supports to move the gear-wheels of the numbered wheels in and out of mesh with the gear-wheels with which the sectors mesh, a locking device for the sectors, and means for releasing the locking device simultaneously with the shifting of the supports for the numbered wheels.

10. An apparatus for totaling cash payments, comprising slidable supports, numbered wheels mounted in the supports and each provided with a gear-wheel, gear-wheels, sectors meshing with the latter gear-wheels, other sectors connected with the first-mentioned sectors and provided with notched plates, key-levers connected with said sectors, means for sliding the supports to move the gear-wheels of the numbered wheels into and out of mesh with the gear-wheels with which the sectors mesh, oscillating levers, springs secured to the levers and provided with rollers for engaging the notched plates, and means for oscillating the levers, to disengage the rollers from the notches of said plates simultaneously with the shifting of the supports of the numbered wheels.

In testimony that we claim the foregoing as our invention we have signed our names in presence of two subscribing witnesses.

HENRY POTTIN.
LUCIE MOUSSIER.

Witnesses:
EUGÈNE WATTIER,
EDWARD P. MACLEAN.